United States Patent
Meade, II

(10) Patent No.: US 7,251,047 B2
(45) Date of Patent: Jul. 31, 2007

(54) VIRTUAL MEDIA TRAY

(75) Inventor: William Kendall Meade, II, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1010 days.

(21) Appl. No.: 10/355,307

(22) Filed: Jan. 31, 2003

(65) Prior Publication Data

US 2004/0150157 A1    Aug. 5, 2004

(51) Int. Cl.
*G06F 15/00* (2006.01)

(52) U.S. Cl. .................. 358/1.13; 358/1.15; 358/1.16; 358/1.18; 358/402; 358/403; 358/450; 399/393

(58) Field of Classification Search ............... 358/1.15, 358/1.13, 1.18, 1.16, 402, 403, 407, 450; 399/393
See application file for complete search history.

(56) References Cited

U.S. PATENT DOCUMENTS

| | | | |
|---|---|---|---|
| 5,358,238 A | 10/1994 | Mandel et al. | 271/298 |
| 5,704,609 A | 1/1998 | Mandel et al. | 271/290 |
| 5,982,996 A | 11/1999 | Snyders | 395/114 |
| 6,049,391 A | 4/2000 | Farrell | 358/1.15 |
| 6,658,456 B1 * | 12/2003 | Shimoosawa | 709/206 |
| 7,086,001 B1 * | 8/2006 | Hicks et al. | 715/523 |
| 7,136,180 B2 * | 11/2006 | Utsunomiya | 358/1.15 |
| 7,142,690 B2 * | 11/2006 | Hyakutake et al. | 382/100 |
| 2003/0025934 A1 * | 2/2003 | Takamiya | 358/1.15 |

FOREIGN PATENT DOCUMENTS

| | | |
|---|---|---|
| EP | 1182860 | 2/2002 |
| JP | 07-023167 | 1/1995 |
| JP | 2000-032183 | 1/2000 |
| JP | 2001-051914 | 2/2001 |
| JP | 2002-259548 | 9/2002 |
| JP | 2002-358178 | 12/2002 |

* cited by examiner

*Primary Examiner*—Douglas Q. Tran
*Assistant Examiner*—Chan S. Park

(57) ABSTRACT

A virtual media tray causes a print device to perform one or more operations in response to a request to print a document. The operations may include storing, emailing, or faxing a copy of the document to another location. The operations may also include adding text in the form of a header, footer, or watermark when the document is printed. An operation associated with a virtual print tray may also have an associated condition such that the operation is performed when the associated condition is satisfied.

26 Claims, 3 Drawing Sheets

VIRTUAL MEDIA TRAY

TECHNICAL FIELD

This invention relates to document handling system, and more particularly to print media trays.

BACKGROUND

Many business environments establish policies and/or procedures associated with documents generated within a company. Such policies may include definitions of standard text or watermarks that are printed on documents, policies that require copies of printed documents be stored in a document management system, or policies that require copies of documents be emailed or faxed to management or other individuals.

Networked printers provide a centralized print device that is available to users of any number of computer systems that are connected to the network. Many printers also have multiple print media trays, which allow users to print documents to different media (e.g., legal or letter size paper, colored paper, transparencies, etc.). Networked printers may also be configured to automatically implement document policies and/or procedures to be applied to documents that are sent to the printer.

SUMMARY

A virtual media tray is described. Virtual media trays allow multiple or alternative output destinations to be defined for documents sent to a print device.

BRIEF DESCRIPTION OF THE DRAWINGS

The same numbers are used throughout the drawings to reference like features and components.

DETAILED DESCRIPTION

Introduction

Figure 1:
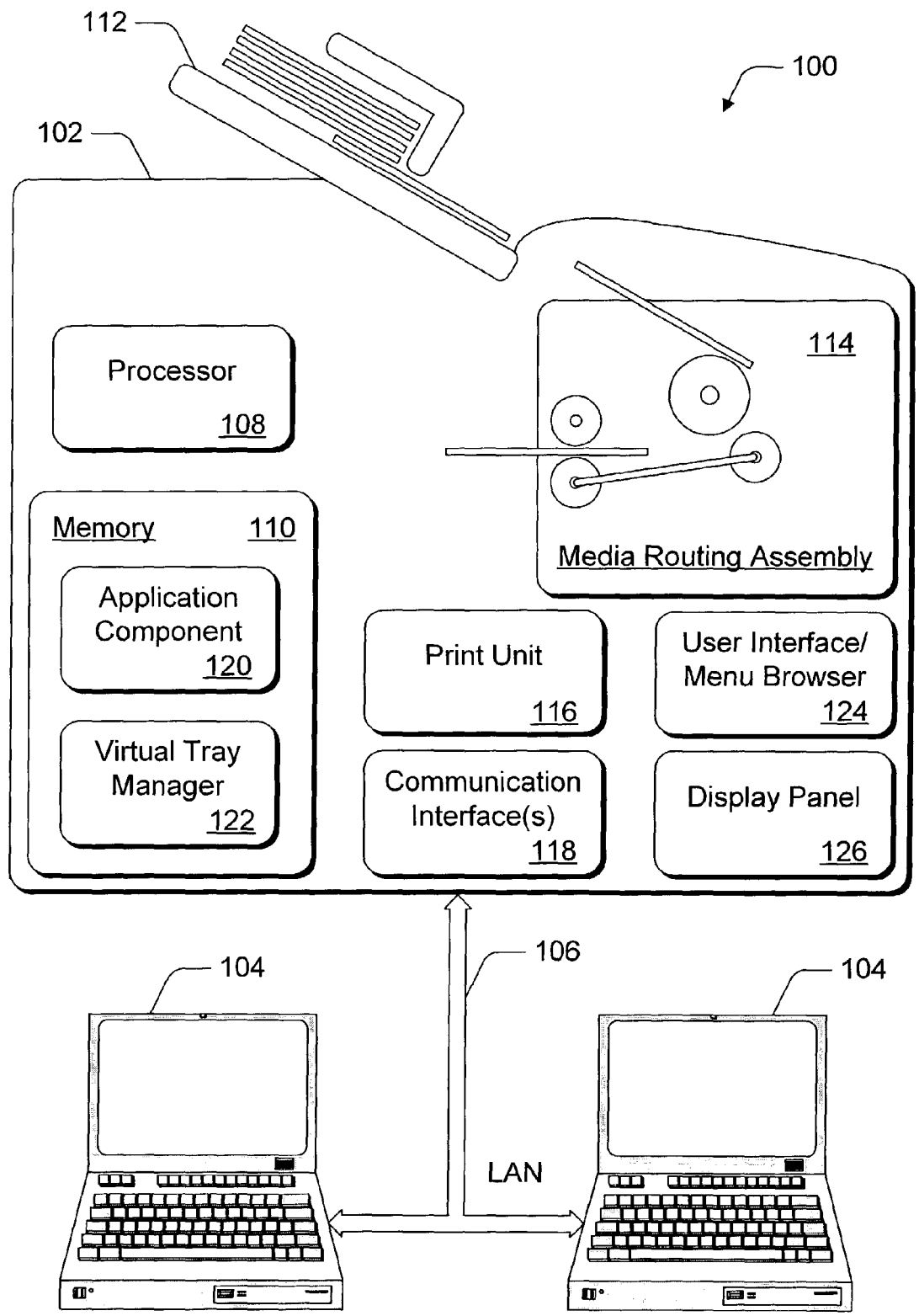
FIG. 1 is a block diagram that illustrates various components of an example network environment that includes an exemplary printing device implemented to support virtual media trays.

The following describes sending documents to virtual media trays associated with a print device. The following method will be described with reference to a networked printer, but it is recognized that the described method may be implemented in any print device that supports two-way network communication, such as a photocopier, fax machine, or other multi-function device.

Many network printers have multiple physical paper trays that can hold print media of various sizes and of various types. When a user sends a document to the printer to be printed, the user (or an application through which the document is sent) specifies the physical paper tray from which the printer will pull paper on which to print the document. Some printers can be configured such that each paper tray is associated with a paper size and/or other paper properties, such as weight or color. In such an implementation, a user (or application) can specify the size (or other properties) of paper to be used when printing a document, without specifying a particular physical paper tray. The printer then determines the appropriate physical paper tray based on the indicated paper properties.

Such network printers may also be configured to manage virtual media trays that define combinations of physical paper trays and other operations. The other operations may include operations that result in a document being sent, for example by fax or email, to one or more recipients; operations that result in a copy of a document being stored at a particular network location (e.g., based on an IP address); and operations that result in specific header, footer, or watermark data being printed as part of the document. In some instances the operations may cause the printer to pull information (e.g., headers, footers, watermarks, IP addresses, email addresses, fax numbers, web pages, public encryption keys, accounting billing codes, etc.) from the network to be used in processing a document so that is can be encrypted, stored, and/or transmitted. Additionally, operations may have conditions associated with them such that a particular operation is only performed if the specified condition is met.

For example, a legal department may have a network-based document management system for recording copies of all documents that are sent to clients. Rather than rely on employees to remember to copy-documents into the document management system, a virtual media tray can be defined for a network printer such that for each document that is sent to the virtual tray, the printer automatically sends a copy of the document to the document management system in addition to printing the document to print media that is stored in a physical print tray that is also associated with the virtual media tray.

In another example, a company policy may prohibit employees from printing photographs to network printers. To support such a policy, a virtual media tray may be defined that causes the printer to email a copy of a document to a particular individual if the print coverage of the document is greater than 5%, which is the coverage of a page filled with "E" (graphics typically cover 60-90% of the page). In this example, a condition associated with the operation determines the print coverage of the document associated with the print request. If the print coverage is greater than 5%, then the operation is defined to pull from the network the email address for direct supervisor of the user requesting that the document be printed, and to email a copy of the document to the email address.

According to another example implementation to support a legal department, the virtual tray uses an embedded identifier (e.g., email address, employee number, national identification number, patent agent number, etc.) in a document to look up a public encryption key, preferred document format, and/or preferred communication method, associated with a document recipient (e.g., an outside counsel or a client). In one implementation, an LDAP (Lightweight Directory Access Protocol) server may be used to support such data lookup. Given a preference profile for a document recipient (or list of document recipients) virtual trays could then automatically transpose (e.g., from an MS Word format to a PDF version), automatically encrypt, and automatically transmit the document using the recipient's preferred email, instant messaging, faxing, or other communication means. Accordingly, virtual trays can be used to reduce errors in routine document storage, transmission, and security processes.

Virtual trays may also be implemented to process metadata on documents. For example, when a color document prints, it uses multiple color planes (CMYK) that each has an individual coverage of consumables (ink or toner). The cover of C, M, Y, and K, on a document, the document's number of pages, whether the document is printed simplex/duplex, etc. are examples of metadata. Virtual trays may thus enable improvements in marketing research panel studies, for example, by automating the reporting of toner use metadata. When the reporting of such metadata is automated and/or simplified, an increased number of people may be willing to participate in panel studies. A virtual-tray based consumables measurement panel also increases the quality of the information reported by eliminating the possibility for human error to be introduced.

Exemplary Virtual Media Tray Environment

FIG. 1 illustrates components of an exemplary network environment 100 in which virtual media trays can be implemented. Printing device 102 is connected with one or more computing systems 104 via data communication network 106.

Computing system 104 can be any type of computing system capable of sending data to and/or receiving data from printing device 102, including, but not limited to, a networked desktop computing system, a networked fax machine, and an email server. The data communication network 106 can be any type of network, such as a local area network (LAN) or a wide area network (WAN), using any type of network topology and any network communication protocol. Although only a few devices are shown communicatively linked via network 106, a typical network can have any number of devices connected to it, either directly or indirectly via another network system. The Internet is an example of multiple connected network systems, each having multiple devices. Printing device 102 and the computing system 104 can also have modems and/or network cards that facilitate network communication and data transfer via data communication network 106. Alternatively, printing device 102 and computing system 104 may be connected directly via a parallel, serial, USB, wireless, or other such connection.

Printing device 102 includes one or more processors 108, a memory component 110, a physical print tray 112, a media routing assembly 114, a print unit 116, and one or more communication interfaces 118. Additionally, although not shown, a system bus typically connects the various components within printing device 102.

Printing device 102 also includes an application component 120 and a virtual tray manager 122 that are implemented as permanent memory modules stored in memory component 110, or implemented with other components in printing device 102. For example, an application component can be implemented as a component of processor 108, or as a component of a printer controller. Application component 120 and virtual tray manager 122 are programmed and tested like software, and are distributed with printing device 102. Application component 120 can be implemented to coordinate operations of the hardware within printing device 102 and contains programming constructs used to perform such operations. Virtual tray manager 122 is implemented to manage virtual media trays associated with the printer 102 to which documents may be sent, causing the printing device to perform alternate and/or additional operations. Virtual tray manager 122 may be implemented as part of application component 120.

Processor(s) 108 process various instructions to control the operation of printing device 102 and to communicate with other electronic and computing devices.

Memory component 110 stores various information and/or data such as configuration information, fonts, templates, print data, and menu structure information.

Physical print tray 112 holds physical print media, such as paper, plastic, fabric, Mylar, transparencies, and the like. The print media is fed from the physical print tray 112 to the media routing assembly 114, which sends the print media to the print unit 116 where an image is printed onto the print media.

Communication interface(s) 118 provide a connection between printing device 102 and one or more computing devices 104 or data communication networks 106. Communication interfaces 118 may include, for example, one or more of a parallel, serial, USB, wireless, or network interface. Implemented as a network interface, communication interface 118 allows devices coupled to a common data communication network to send print jobs, menu data, and other information to printing device 102 via the network 106. Similarly, implemented as a parallel, serial, or USB interface, communication interface 118 provides a data communication path directly between printing device 102 and other electronic or computing devices, such as a fax machine or an email server.

Printing device 102 may also include a user interface and menu browser 124, and a display panel 126. The user interface and menu browser 124 allows a user of printing device 102 to navigate the device's menu structure. User interface 124 can include indicators and/or a series of buttons, switches, or other selectable controls that are manipulated by a user of the printing device. Display panel 126 is a graphical display that provides information regarding the status of printing device 102 and the current options available to a user through the menu structure. Printing device 102 may be implemented such that virtual media trays can be managed through the user interface 124.

Exemplary Virtual Media Tray Manager

Figure 2:
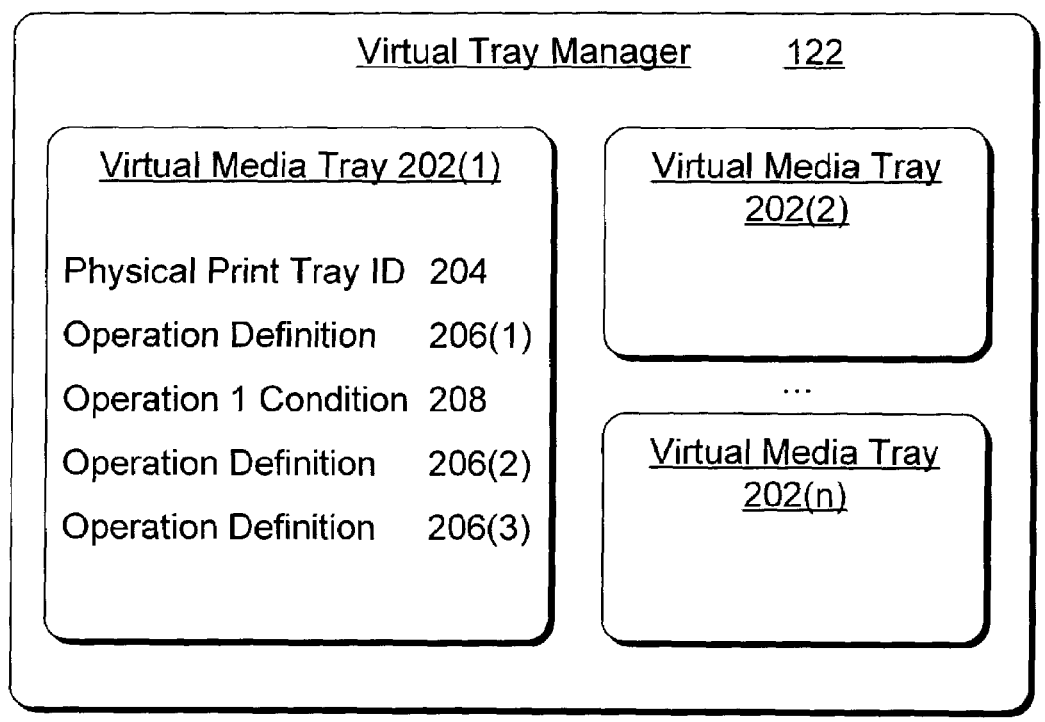
FIG. 2 is a block diagram that illustrates an exemplary virtual tray manager.

FIG. 2 illustrates components of an exemplary virtual media tray manager 122. Virtual media tray manager stores data that defines one or more virtual media trays 202. For example, virtual media tray 202(1) is defined as a combination of a physical print tray (indicated by physical print tray ID 204), a conditional operation (indicated by operation definition 206(1) and operation condition 208), and two non-conditional operations (indicated by operation definition 206(2) and operation definition 206(3). A virtual media tray 202 may be defined as any combination of physical print trays, conditional operations, and/or non-conditional operations. In one implementation, operations are defined using a scripting language, such as JAVA, Microsoft Active Server Pages (ASP), PHP, or PERL running on an embedded web server in the hard copy device. In an alternate implementation, an embedded web server in the hard copy device may call an external web server to perform the operation.

Printing devices may be implemented such that virtual media trays can be defined and/or managed (e.g., added, modified, deleted) through a user interface and screen display associated with the printing device, such as user interface/menu browser 124, or through a user interface that can be accessed through a computing system that is connected to the printing device via network 106.

Methods for Printing to Virtual Print Trays

Figure 3:
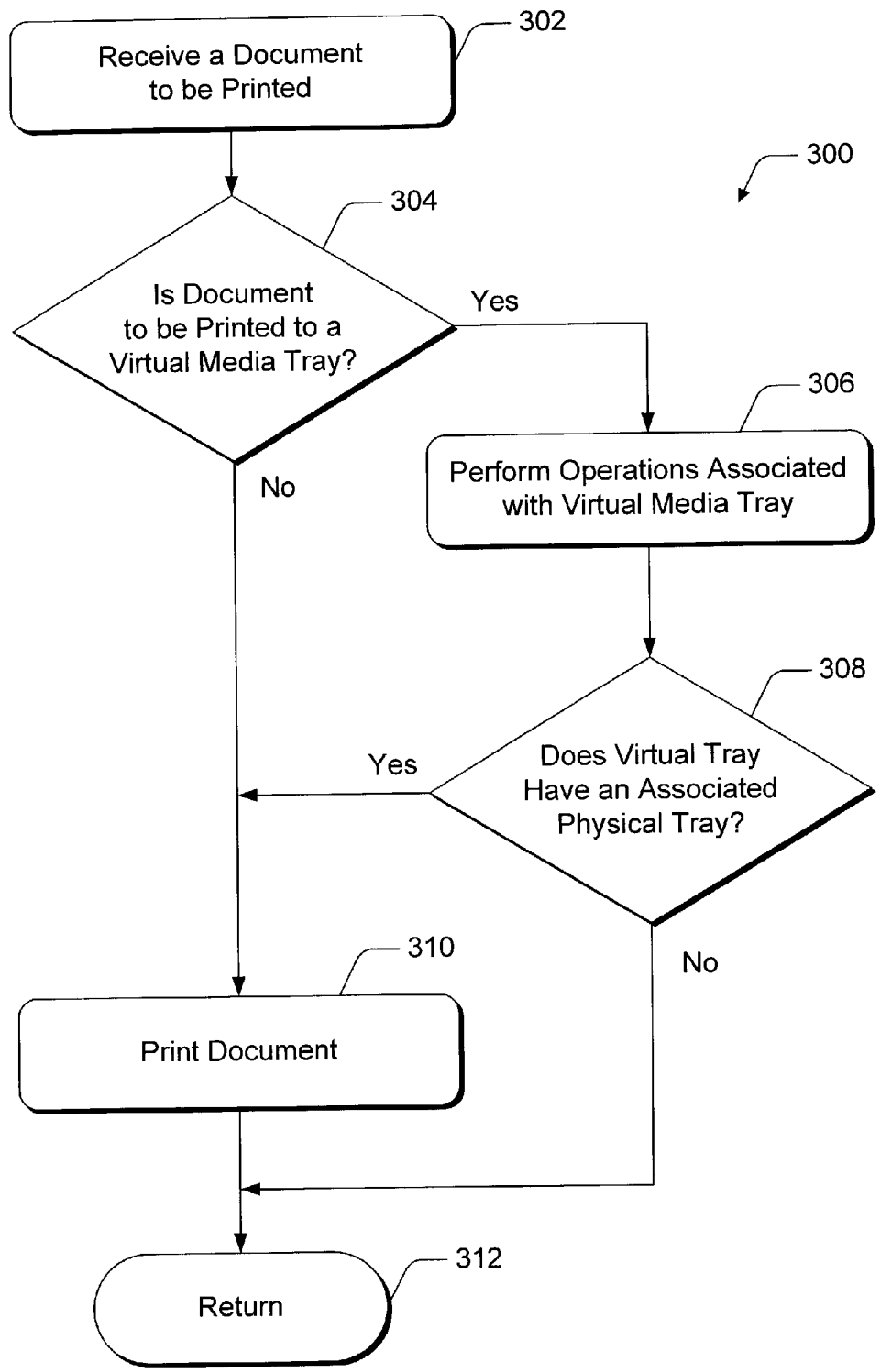
FIG. 3 is a flow diagram that describes an exemplary method for handling documents sent to virtual media trays.

FIG. 3 illustrates an exemplary method 300 for handling documents sent to virtual media trays. The order in which the method is described is not intended to be construed as a limitation. Furthermore, the method can be implemented in any suitable hardware, software, firmware, or combination thereof. In one embodiment, the method can be implemented by the system illustrated in FIGS. 1 and 2.

At block 302, network printer 102 receives a document to be printed. Along with the data that represents the document to be printed, the printer receives print parameters, which include an indication of a print tray to which the document is to be printed. For example, the designated print tray may be a physical tray that holds standard letter size paper. Alternatively, the designated print tray may be a virtual media tray.

At block 304, the printer determines whether the specified print tray is a virtual media tray. The printer determines the specified tray by examining print parameters that are sent with the document print request. If the specified print tray is not a virtual tray (the "No" branch from block 304), then at block 310 the printer prints the received document on print media that physically resides in the specified physical print tray.

At block 306, when it is determined that the specified print tray is a virtual media tray (the "Yes" branch from block 304), the print device performs operations associated with the specified virtual media tray. As described above, a virtual media tray may be defined to represent any number of combinations of physical print trays, network locations, locations outside of the network, and/or other operations or print parameters, which may be conditional.

A virtual media tray may be defined as a combination of multiple physical print media trays. Sending a document to such a virtual tray results in the document being printed multiple times—once on print media from each designated physical tray. This implementation may be used to automatically print multi-part forms, especially if each physical tray is loaded with different colored print media.

A virtual media tray may also be defined to include one or more network locations. For example, a virtual media tray may be defined as a combination of a physical print media tray that holds standard legal size paper and a network location (such as an IP address) associated with a document management system. Sending a document to such a virtual media tray results in an electronic copy of the document being stored in the document management system, and a hard copy of the document being printed on legal size paper.

Similarly, a virtual media tray may be defined to include one or more locations outside of the network. For example, a virtual media tray may be defined with an associated fax number or email address. When a document is sent to the virtual media tray, in addition to being printed, a copy of the document is faxed to the fax number or emailed to the email address that is associated with the virtual media tray. In one implementation, the print device may include a modem and a fax application capable of sending faxes and/or an email application capable of emailing copies of documents. In an alternate implementation, the print device is configured to send a copy of the document to another network location that serves as a fax machine or email server.

A virtual media tray may also be defined to specify other parameters or operations such as print parameters, conditional parameters, or a combination thereof. For example a virtual media tray may be defined such that a watermark is printed on each page of each document sent to the virtual media tray. The watermark may be stored in memory associated with the print device, such as memory 110, or it may be stored at a network-accessible location to be retrieved by the printer. In another implementation, rather than a watermark, a particular footer or header may be printed on each page. Such implementations provide a mechanism for centralizing control of, for example, company-specific or department-specific text that is to be printed on documents.

In alternate implementations, a conditional parameter may be associated with a virtual print media, for example, such that the printer emails a copy of a document to a user's boss if the ink coverage is greater than 5%. This type of condition can be used to help enforce company policies that, for example, forbid employees from printing pictures on the network printers. In this example, when the printer receives a request to print a document that satisfies the conditions associated with the virtual media tray, the printer requests information from the network that identifies the user that submitted the document print request, and in this example, information that identifies an email address associated with the user's boss.

At block 308, after evaluating any conditions and performing any operations associated with the specified virtual media tray, the print device determines whether a physical print tray is also associated with the specified virtual media tray. If it is determined that there is a physical print tray associated with the specified virtual media tray (the "Yes" branch from block 308), then at block 310 the print device prints the document on print media stored in the specified physical print tray. If, on the other hand, it is determined that there is not a physical print tray associated with the specified virtual media tray (the "No" branch from block 308), then at block 312 the method terminates.

By defining a virtual media tray that does not have an associated physical paper tray, the print device can be configured to perform operations associated with a document that may not be print-related. For example, in such an implementation, a user may, for example, send a document to a document management system by simply "printing" the document to a specific virtual media tray that in turn causes the printer to copy the document to the document management system.

CONCLUSION

Virtual media trays can be defined to perform many functions associated with the printing of a document. The functions may include automatically adding text, for example, through footers, headers, or watermarks; and/or automatically sending one or more copies of a document to another network or other location, such as a fax number or an email address.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    receiving a document and a request to process a document using a virtual media tray;
    wherein the printer first determines whether the print tray is a virtual media tray managed by the printer, wherein the virtual media tray comprises a combination of a physical paper tray identifier and one or more elements from the group elements comprising:
        an operation that causes the system to forward a copy of the document to a network location,
        an operation that causes the system to email a copy of the document to an email address, an operation that causes the system to fax a copy of the document to a fax number, and a combined operation that may be associated with one or more above three operations;

wherein only the document is physically printed when it is determined that the print tray is not a virtual media tray and otherwise the operations associated with the virtual media tray are performed and the document physically located in the physical media tray with the associated paper tray identifier is printed.

2. The method as recited in claim 1, wherein the performing the operations associated with the virtual media tray comprises sending an electronic copy of the document to a location associated with the virtual media tray.

3. The method as recited in claim 2, wherein the location is selected from a group of locations comprising an email address, a fax number, and an IP address.

4. The method as recited in claim 1, wherein the performing the operations associated with the virtual media tray comprises:
  identifying a recipient to receive the document;
  identifying profile information associated with the recipient; and
  processing the document based on the profile information.

5. The method as recited in claim 4, wherein the identifying profile information comprises:
  issuing a request for the profile information to a networked resource; and
  receiving the profile information in response to the request.

6. The method as recited in claim 4, wherein the processing the document based on the profile information comprises converting the document to a format specified by the profile information.

7. The method as recited in claim 4, wherein the processing the document based on the profile information comprises encrypting the document using an encryption key specified by the profile information.

8. The method as recited in claim 4, wherein the processing the document based on the profile information comprises storing the document in a location specified by the profile information.

9. The method as recited in claim 4, wherein the processing the document based on the profile information comprises transmitting the document using a transmission medium specified by the profile information.

10. The method as recited in claim 1, wherein the performing the operations associated with the virtual media tray comprises adding a footer to one or more pages of the document.

11. The method as recited in claim 1, wherein the performing the operations associated with the virtual media tray comprises adding a header to one or more pages of the document.

12. The method as recited in claim 1, wherein the performing the operations associated with the virtual media tray comprises adding a watermark to one or more pages of the document.

13. The method as recited in claim 1, wherein the performing the operations associated with the virtual media tray comprises:
  determining whether a condition associated with the operation is met; and
  in an event that the condition is met, performing the operation.

14. The method as recited in claim 13, wherein the condition is based on a print coverage of the document.

15. The method as recited in claim 13, wherein the condition is based on an identity associated with a user from which the request is received.

16. The method as recited in claim 15, wherein the operation comprises instructions that direct the printer to store a copy of the document at a specified network location.

17. The method as recited in claim 15, wherein the operation comprises instructions that direct the printer to email a copy of the document to a specified email address.

18. The method as recited in claim 15, wherein the operations associated with the virtual media tray comprises instructions that direct the printer to fax a copy of the document to a specified fax number.

19. The method as recited in claim 15, further comprising:
  associating the condition with the operation such that in response to the request to print the document, the operation is performed in an event that the condition is met.

20. One or more computer-readable media encoded with computer executable instructions that, when executed, direct a printer to:
  receive a document and a request to process a document using a virtual media tray,
  determine whether the print tray is a managed by the printer,
  wherein the virtual media tray comprises a combination of a physical paper tray identifier and one or more elements from the group of elements consisting of:
    an operation that causes the system to forward a copy of the document to a network location,
    an operation that causes the system to email a copy of the document to an email address,
    an operation that causes the system to fax a copy of the document to a fax number, and
  a combined operation that may be associated with one or more above three operations;
  wherein only the document is printed when it is determined that the print tray is not a virtual media tray and otherwise the operations associated with the virtual media tray are performed and the document physically located in the physical media tray with the associated pacer tray identifier is printed.

21. The one or more computer-readable media as recited in claim 20 wherein the operations associated with the virtual media tray indicate sending a document copy to a network location and further comprising computer executable instructions that, when executed, direct the computing system to:
  send a copy of the document to the network location.

22. The one or more computer-readable media as recited in claim 20 wherein the operations associated with the virtual media tray indicate storing a document copy in a document management system and further comprising computer executable instructions that, when executed, direct the computing system to:
  store a copy of the document in the document management system.

23. The one or more computer-readable media as recited in claim 20 wherein the operations associated with the virtual media tray indicate sending a document to a location and further comprising computer executable instructions that, when executed, direct the computing system to:
  email a copy of the document to the location via an email address associated with the location.

24. The one or more computer-readable media as recited in claim 20 wherein the operations associated with the virtual media tray indicate sending a document to a location and further comprising computer executable instructions that when executed, direct the computing system to:

fax a copy of the document to the location via a fax number associated with the location.

25. The one or more computer-readable media as recited in claim 20 wherein the operations associated with the virtual media tray indicate adding a watermark to the document and further comprising computer executable instructions that, when executed, direct the computing system to:

retrieve the watermark from a location on the network; and print the watermark in along with the document using print media stored in a physical print tray associated with the virtual print tray.

26. The one or more computer-readable media as recited in claim 20 wherein the operations associated with the virtual media tray indicate performing a conditional operation and further comprising computer executable instructions that, when executed, direct the computing system to:

determine whether a condition is met with respect to the request to print the document; and in an event that the condition is met, perform the operation.

* * * * *

UNITED STATES PATENT AND TRADEMARK OFFICE
CERTIFICATE OF CORRECTION

PATENT NO. : 7,251,047 B2  Page 1 of 1
APPLICATION NO. : 10/355307
DATED : July 31, 2003
INVENTOR(S) : William Kendall Meade, II It is certified that error appears in the above-identified patent and that said Letters Patent is hereby corrected as shown below:

In column 8, line 29, in Claim 20, delete "consisting of:" and insert -- comprising: --, therefor.

In column 8, line 44, in Claim 20, delete "pacer" and insert -- paper --, therefor.

In column 8, lines 47-48, in Claim 21, delete "a network location" and insert -- the network location --, therefor.

In column 9, line 6, in Claim 24, after "that" insert -- , --.

Signed and Sealed this

Fifteenth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,251,047 B2  Page 1 of 1
APPLICATION NO. : 10/355307
DATED : July 31, 2007
INVENTOR(S) : William Kendall Meade, II It is certified that error appears in the above-identified patent and that said Letters Patent is hereby corrected as shown below:

In column 8, line 29, in Claim 20, delete "consisting of:" and insert -- comprising: --, therefor.

In column 8, line 44, in Claim 20, delete "pacer" and insert -- paper --, therefor.

In column 8, lines 47-48, in Claim 21, delete "a network location" and insert -- the network location --, therefor.

In column 9, line 6, in Claim 24, after "that" insert -- , --.

This certificate supersedes the Certificate of Correction issued July 15, 2008.

Signed and Sealed this

Fifth Day of August, 2008

JON W. DUDAS
*Director of the United States Patent and Trademark Office*